United States Patent
Vanghi

(10) Patent No.: US 7,085,581 B2
(45) Date of Patent: Aug. 1, 2006

(54) RPC CHANNEL POWER CONTROL IN A HDR NETWORK

(75) Inventor: Vieri Vanghi, La Jolla, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 694 days.

(21) Appl. No.: 09/940,293

(22) Filed: Aug. 27, 2001

(65) Prior Publication Data

US 2003/0054773 A1    Mar. 20, 2003

Related U.S. Application Data

(60) Provisional application No. 60/295,493, filed on Jun. 4, 2001.

(51) Int. Cl.
*H04B 7/00* (2006.01)

(52) U.S. Cl. .................. 455/522; 455/562; 455/561

(58) Field of Classification Search ............... 455/522, 455/63.1, 69, 515, 63.2
See application file for complete search history.

(56) References Cited

U.S. PATENT DOCUMENTS

| | | | |
|---|---|---|---|
| 6,678,257 B1 * | 1/2004 | Vijayan et al. | 370/320 |
| 6,687,510 B1 * | 2/2004 | Esteves et al. | 455/522 |
| 2001/0031647 A1 * | 10/2001 | Scherzer et al. | 455/562 |
| 2002/0131376 A1 * | 9/2002 | Wheatley, III et al. | 370/328 |
| 2004/0067767 A1 * | 4/2004 | Esteves et al. | 455/522 |

FOREIGN PATENT DOCUMENTS

| | | |
|---|---|---|
| EP | 0986282 | 3/2000 |
| EP | 1081875 | 3/2001 |
| WO | WO 9824199 | 6/1998 |
| WO | WO 0014900 | 3/2000 |
| WO | WO 0054430 | 9/2000 |
| WO | WO 0101722 | 1/2001 |
| WO | WO 0227967 | 4/2002 |

* cited by examiner

*Primary Examiner*—Creighton Smith
(74) *Attorney, Agent, or Firm*—Coats & Bennett, P.L.L.C.

(57) ABSTRACT

In a communication network based on the TIA/EIA/IS-856 standard, or in other network types where forward link power control is desirable but where no reverse link channel or sub-channel to direct such power control is available, forward link rate request information from an access terminal may be used to infer carrier-to-interference (C/I) ratios at the access terminal. Such information allows the network to control power for the forward link channel of interest. In a TIA/EIA/IS-856 setting, the network uses DRC channel information from the access terminal to set RPC channel power transmitted to the access terminal from one or more sectors in the network. That is, radio base stations within the network may determine C/I or like values for active access terminals using DRC channel information from those terminals and calculated needed RPC channel power accordingly. This process may be extended to include access control procedures.

58 Claims, 4 Drawing Sheets

RPC CHANNEL POWER CONTROL IN A HDR NETWORK

RELATED APPLICATIONS

This application claims priority under 35 USC 119 from the provisional application Ser. No. 60/295,493 filed on Jun. 4, 2001, and entitled "1x EVDO RPC Channel Power Control."

BACKGROUND OF THE INVENTION

The present invention generally relates to wireless communication systems, and particularly relates to controlling the power of the Reverse Power Control channel in a high data rate packet network.

Transmit power control factors prominently in a number of wireless communication schemes. For example, conventional Code Division Multiple Access (CDMA) systems, such as those defined by the IS-95B standard, use both reverse link and forward link power control. Generally, these schemes use the receiving end to provide power control feedback information. Thus, for forward link power control in a conventional CDMA network, a handset or other type of access terminal provides power control information to the network transmitter, indicating whether the transmitter should increase or decrease its transmitted power to the terminal.

The above power control schemes are closed loop, meaning that transmit power is controlled based on actual receiver conditions. Characteristically, closed loop power control relies on dedicated power control channels or sub-channels. For example, in conventional CDMA systems, forward link power control relies on power control bits provided by terminals on their reverse link power control channels.

As communication systems evolve, offering greater system capacity, higher data rates, and new applications, the channel structures used to carry data traffic and control information between communication networks and access terminals have become increasingly sophisticated. For example, in the TIA/EIA/IS-856 standard covering high data rate (HDR) packet data networks, the forward link channel structure intermixes both code and time multiplexed channels. HDR networks configured in accordance with the TIA/EIA/IS-856 standard are also referred to as "1x EVDO" networks, indicating the first stage of evolutional advancement beyond the TIA/EIA/IS-2000 standard toward third-generation CDMA networks for data-only applications.

In HDR networks, the forward link traffic channel from a network transmitter to an access terminal is rate controlled rather than power controlled. That is, a HDR network transmitter always transmits at maximum power on its forward link traffic channels, with each access terminal served by the transmitter requesting the maximum data rate that the available power will support. In general, a terminal closer to the transmitter receives data at a higher rate than one further away, but more broadly one might state that terminals request higher data rates from the network as reception conditions improve at the terminal. The TIA/EIA/IS-856 standard defines sixteen data rates at which terminals may request to receive forward link traffic channel data.

Other forward link channels used in HDR networks are not rate controlled. For example, the Reverse Power Control (RPC) channel is a forward link channel transmitted to access terminals at a constant data rate. Access terminals use information received from the network on the RPC channel to control their reverse link transmit power. Thus, the RPC channel is used by the network to implement closed loop control of access terminal transmit power to minimize interference between terminals.

However, there exists no explicit mechanism for controlling the power of the forward link RPC channel. Defining a reverse link channel or sub-channel on which RPC channel power control information might be carried would be inefficient and in any case is not provided for in the standard. Nonetheless, controlling RPC channel power on the forward link based on actual reception conditions at the access terminals would be advantageous.

BRIEF SUMMARY OF THE INVENTION

The present invention comprises methods and apparatus to control RPC channel power in HDR networks, such as those configured in accordance with the TIA/EIA/IS-856 standard. Each access terminal in a HDR network generally requests the highest forward link traffic channel data rate that signal conditions at the terminal will support. Data rate requests transmitted from the terminals to the network on each terminal's reverse link Data Rate Control (DRC) channel may be used by the network to infer reception conditions at each terminal. Thus, the network can set the RPC channel power of each access terminal based on the forward link data rate requested by that terminal.

Setting RPC channel power based on requested forward link data rate for a given access terminal may involve a "mapping" from the requested rate to an estimate of signal conditions at that terminal. Thus, the network may, for example, estimate the carrier-to interference (C/I) ratio for the terminal based on the data rate requested by the terminal. The estimated C/I ratio indicates signal conditions at the terminal and the network may thus calculate a desired RPC channel power for that terminal based on the estimated C/I ratio, or based on an estimated signal-to-noise ratio (SNR) value for the RPC channel.

However, the aggregate RPC channel power, that is the RPC channel power allocated to the total number of terminals active within a given network sector, is limited. Therefore, the actual RPC channel power allocated to each terminal may be set as a function of the desired RPC channel power and as a function of the total RPC channel power available. RPC channel power is part of the Medium Access Control (MAC) channel power, thus the aggregate RPC channel power available for serving a plurality of terminals within a given sector is limited by the total MAC channel power available in that sector.

Numerous variations exist for allocating available RPC channel power among the individual terminals within a given network sector. However, some allocation schemes are more optimal than others, and may result in more nearly meeting the actual RPC channel power requirements of a majority of terminals at any given time.

Further, RPC channel power settings for a given terminal may be adjusted or otherwise compensated based on the presumed reliability of the C/I estimate. That is, as data rate requests from the various terminals are mapped to corresponding C/I estimates, the C/I estimates may be adjusted to reflect, for example, whether an individual terminal is in soft or softer handoff.

In addition to enabling RPC channel power control within the various sectors of a communication network the present invention may provide a basis for network access control or regulation. For example, if the aggregate desired RPC channel power within a given sector exceeds the available RPC channel power in that sector by a wide enough margin or for a long enough period of time, that sector may be deemed "congested." The network may then take measures to mitigate the congested condition of that sector by, for example, limiting or restricting additional new connections within that sector, or by releasing some of the active connections within the sector.

Those skilled in the art will recognize additional features and advantages of the present invention upon reading the following detailed description, and in consideration of the supporting drawings.

DETAILED DESCRIPTION OF THE INVENTION

Exemplary details presented in the following discussion describe control of the transmit power associated with the Reverse Channel Power (RPC) channels used in high data rate (HDR) packet data wireless communication networks based on the TIA/EIA/IS-856 standard. It should be understood that techniques outlined herein may be generally used where a received signal lacking explicit power control data nonetheless may be used to derive power control information for an associated transmit channel.

Figure 1:
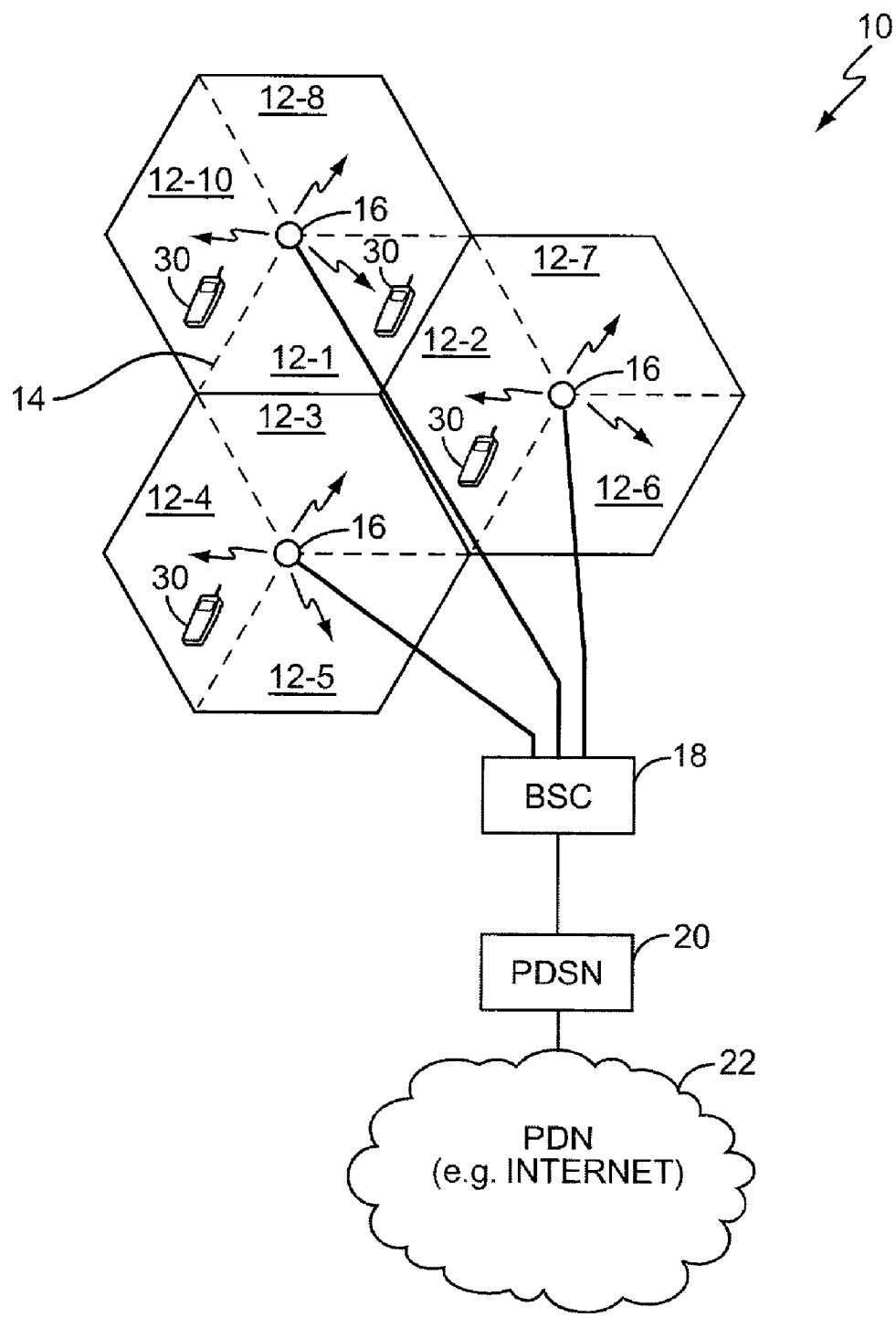
FIG. 1 is a diagram of an exemplary HDR network.

Turning now to the drawings, FIG. 1 is a diagram of an exemplary wireless communication network generally referred to by the numeral 10, and which may be configured in accordance with TIA/EIA/IS-856 standards. Those skilled in the art will appreciate that the network 10 appears in simplified form to aid clarity of discussion. Actual implementations of the network 10 may include items not shown in this diagram, such as home location registers (HLRs), visitor location registers (VLRs), equipment identification systems, and various gateway systems.

As illustrated, the network 10 comprises a number of sectors 12, one or more cells 14, radio base stations (RBSs) 16 (also referred to as "cell sites"), a base station controller (BSC) 18, a packet data serving node (PDSN) 20 which interfaces the network 10 to one or more packet data networks (e.g., the Internet), and a mobile switching center (MSC) 24 which interfaces the network 10 to one or more other networks 26, such as the Public Switched Telephone Network (PSTN) or an Integrated Services Digital Network (ISDN).

In operation, access terminals (ATs) 30 communicate with the network 10 via wireless signaling. The network 10 defines forward link channels used to carry control information and traffic data to the ATs 30, and further defines reverse link channels on which it receives control information and traffic data from the ATs 30. Some forward and reverse link channels are shared between terminals 30, while other channels are dedicated to specific ones of the terminals 30.

The arrangement of RBSs 16 generally defines the service coverage area of the network 10, with each RBS 16 providing coverage for one or more sectors 12. Typically, each RBS 16 comprises a number of directional antennas (not shown), with each antenna providing coverage for a given sector 12. Generally, a number of contiguous sectors 12 form a cell 14. For example, in the diagram sectors 12-1, 12-2, and 12-3 form a cell 14. Sometimes this division of the network's service area into sectors 12 is referred to as sectorization. Unlike the diagram, however, real sectorization is not ideal, meaning that sectors 12 in a real implementation would have some degree of overlap.

Because of overlap, a given AT 30 might communicate with the network 10 through more than one sector 12. When an AT 30 is supported by more than one sector 12, it is considered to be in soft handoff. If two or more of the sectors involved in the handoff are from the same RBS 16, the AT 30 is considered to be in softer handoff.

The sectors 12 involved in the handoff (soft or softer) define the AT's "active set." Thus, the size of the active set defines the number of sectors involved in handoff. For HDR networks, only one of the sectors 12 within the AT's active set is considered the "serving sector," while the remaining sectors 12 in the active set are considered "non-serving" or "no-service" sectors 12. The sector 12 providing forward link traffic data to the AT 30 is considered the serving sector, however the AT communicates simultaneously with all sectors 12 in its active set on the reverse link.

With HDR, the AT 30 may change serving sector selections every 1.6 ms, based on which sector 12 can provide the best signal to the AT 30. Each sector 12 in the active set receives Data Rate Control (DRC) symbols from the AT 30 on the reverse link DRC channel. These DRC symbols take on, in an exemplary embodiment, one of sixteen values, with each value corresponding to a desired data rate. The serving sector 12 sets the data rate for the next packet on the forward link traffic channel to the AT 30 based on the requested data rate.

The DRC channel information received from the AT 30 also identifies or "points to" which sector 12 should operate as the serving sector for the next forward link traffic data packet sent to the AT 30. This pointing function is realized by the AT using one of a number of spreading covers to code multiplex the DRC symbol. Each sector 12 has a designated cover value and if the cover used to spread the DRC symbol matches that designated cover, that sector 12 becomes the serving sector. A null cover value is also defined, which, when used by the AT 30, indicates to all of the sectors 12 in the AT's active set that the AT 30 is switching from one serving sector to another.

In exemplary HDR implementations, DRC channel information is sent by each AT 30 that is active within the network 10 at a rate of every 1.6 ms, or roughly 600 Hz. Thus, the network 10 may adjust the forward link traffic data rate to the AT 30 at roughly the same rate. Indeed, this ability of HDR networks to perform dynamic rate control is a foundational principal of their operation.

Unlike conventional CDMA networks, which employ both forward and reverse link power control, HDR networks transmit on the forward link at full power all of the time. That is, each RBS 16 transmits for each sector 12 using the full available power at the sector. This transmit power scheme means that ATs 30 closer to an RBS 16 generally enjoy better reception conditions than those ATs 30 farther away. The ATs 30 use their DRC channel to request the forward link traffic data rate that their respective reception conditions will support at acceptable bit error rates (BERs). Because forward link transmit power is constant, the signalto-noise ratio (SNR) at each AT 30 varies with the quality of the forward link between the AT 30 and the transmitting RBS 16.

In contrast to the full power levels used on the forward link traffic channels, the network 10 does implement power control on the reverse link transmissions from the ATs 30. This reverse link power control minimizes interference between the ATs 30 by limiting the transmit power of each AT 30 to the level required to meet SNR requirements at the RBSs 16. The RBSs 16 send reverse link power control information to the ATs 30 using a Reverse Power Control (RPC) channel.

In a given sector 12, the sector's RBS 16 sends RPC commands to each AT 30 in communication with that sector 12 via a RPC channel dedicated to each AT 30. Where an AT 30 is in soft handoff, it receives RPC commands from two or more sectors 12. If the sectors 12 are from the same RBS 16 as occurs in softer handoff, the RPC commands from the different sectors 12 will be the same, but where different RBSs 16 are involved in soft handoff, the AT 30 receives potentially different RPC commands. Logic within the AT 30 is adapted to respond appropriately, even with conflicting RPC commands from different sectors 12.

The RPC channel is part of the Medium Access Control (MAC) channel. Within a given sector 12, the sector's RBS 16 transmits a MAC channel to each of the AT's 30 active within that sector 12. The RPC channel comprises part of the MAC channel's structure. Because the available power for transmitting the MAC channels is limited at the sector 12, the total available RPC channel power is limited. Therefore, the amount of RPC channel power that may be allocated to each AT 30 is also limited.

Because of differing forward link quality conditions between the ATs 30, the RPC channel transmit power required to produce an acceptable SNR for the RPC channel at the ATs 30 varies. Ideally, an RBS 16 would operate to set the RPC channel transmit power for at least some of the ATs active within an associated sector 12 in consideration of actual signal conditions at the AT 30. In this manner, the RPC channel power transmitted to an AT 30 with relatively good received signal conditions would be less than the RPC channel power allocated to an AT 30 with relatively bad received signal conditions. However, no provisions exist for controlling RPC channel power.

Indeed, the TIA/EIA/IS-856 standard does not define a reverse link channel or sub-channel on which power control information for the RPC channel might be carried. The present invention, in at least some embodiments, overcomes this lack of explicit power control information by inferring signal conditions at the AT 30 based on the forward link data rate associated with that AT 30. RPC channel power for the AT 30 may then set based on the inferred signal conditions.

Where the AT 30 has requested a relatively high forward link traffic channel data rate, one may assume that reception conditions are relatively good at that AT 30. In contrast, one may assume relatively poor reception conditions for an AT 30 requesting a relatively low data rate. This relationship between data rate and signal conditions arises because the AT 30 will always request the highest data rate its reception conditions will support.

As noted earlier, a given AT 30 active within at least one of the sectors 12 of the network 10 may request any one of a number of defined data rates using its DRC channel. Thus, received DRC symbols from the AT 30 may be mapped to a range of estimated C/I ratios. That is, a C/I ratio for the AT 30 may be estimated based on the forward link data rate it requests. The transmit power level for the RPC channel to that AT 30 may then be determined based at least in part on the estimated C/I ratio.

The nature of the DRC symbol value to estimated C/I ratio mapping may be one-to-one, that is, there may be a defined C/I ratio estimate for each one of the defined data rates, or multiple data rates may map to a single C/I estimate. A typical range of estimate C/I ratios might span 30 dB, ranging from −15 dB to +12 dB. An exemplary mapping of requested data rate to estimated C/I ratio appears in Table 1 below:

TABLE 1

Example of Requested Data Rate to Estimated C/I Ratio Mapping

| Requested Data Rate (kbps) | 38.4 | 76.8 | 153.6 | 307.2 | 614.4 | 921.6 | 1228.8 | 1843.2 | 2457.6 |
|---|---|---|---|---|---|---|---|---|---|
| Est. C/I Ratio (dB) | −15 | −11 | −7 | −4 | −1 | +2 | +5 | +8 | +12 |

Of course, the above mapping may be varied as needed or desired.

The estimation process may also be based on a mapping function that translates data rate to estimated C/I ratio. This type of mapping function may be expressed as $f^{-1}(R)$, where R is the requested data rate and $f^{-1}$ is the stepwise linear inverse of a function $f$ that the AT 30 uses to determine the DRC symbol value it transmits. That is, AT 30 determines a value for its DRC symbol value using a function $f$ of estimated C/I ratio, so an inverse function of $f$ may be used at the RBS 16 to recover the C/I ratio estimated by the AT 30 based on the data rate requested by that AT 30.

While estimated C/I ratios may be based on the above mapping or the inverse function operation, the estimates may be further enhanced by adjusting them for certain conditions. For example, one may bound estimated C/I ratios between one or more limits, such as between an upper and a lower limit. Further, one may wish to define default values for estimated C/I ratios in situations where a valid DRC symbol value is not available from the AT 30. This absence of valid DRC symbol information may occur, for example, in an erasure event, where the signal power of the received DRC symbol is too low for reliable detection.

Thus, rather than using an initial estimate of C/I ratio for RPC channel power control, the estimate may be compensated or adjusted. One exemplary expression for such an adjusted C/I ratio for the $i^{th}$ AT 30 is given as, $$\gamma_i(R, X) = \begin{cases} \min\{\max\{\gamma_{\min}, f^{-1}(R) + g(X)\}, \gamma_{\max}\}, \text{if the } DRC \text{ is not erased, else} \\ \gamma_{erasure} \end{cases} \quad (1)$$

where R equals the rate as represented by the DRC symbol value, and X is the DRC cover value that identifies the serving sector, and g(X) is a correction factor.

Eq. (1) is repeated for all ATs 30 within a given sector. It sets the estimated C/I ratio for the $i^{th}$ AT 30 in a given sector 12 as follows:

a. compute a first C/I estimate based on mapping from data rate to initial C/I estimate;
b. compensate this first C/I estimate using the correction factor g(X);
c. select the maximum between the compensated, initial C/I estimate, and a minimum defined C/I estimate $\gamma_{min}$; and
d. select the minimum between the result of the preceding step and a maximum defined C/I estimate.

Of course, the above calculations assume the availability of a valid DRC symbol value on which to base these calculations. If a valid value is not available, Eq. (1) sets the estimated C/I ratio $\gamma_i$ to a default value, for example, −10 dB. Exemplary bounding values for $\gamma_{min}$ and $\gamma_{max}$ are −12 dB and +11 dB, respectively.

Compensation of the initial estimated C/I ratio as obtained from the mapping function $f^{-1}$ using the correction factor g(X) is based on the premise that if the current sector 12 is not the serving sector for the $i^{th}$ AT 30, then the C/I estimate determined from the rate mapping function should be reduced because the AT 30 selects the best sector 12 from its active set as the serving sector. All other sectors 12 in the AT's active set, that is, the non-serving sectors 12, may be presumed to offer lower reception performance to the AT 30. Thus, when a sector 12 is not the AT's serving sector, the initial estimated C/I ratio should be reduced, with the correction factor g(X) given as, $$g(X) = \begin{cases} 0 & \text{if the } DRC \text{ is pointed to current sector} \\ c & \text{if the } DRC \text{ has a null cover} \\ a \cdot 10 \cdot \text{Log}(N_{softer} + 1) & \text{if the } DRC \text{ points to } X \in \{X_i\}_{i=1,\ldots N_{softer}}^{softer} \\ a \cdot 10 \cdot \text{Log}(N_{softer} + 1) \cdot b \cdot 10 \cdot \text{Log}(N_{sof} + 1) & \text{if the } DRC \text{ points to } X \in \{X_i\}_{i=1,\ldots N_{soft}}^{soft} \end{cases} \quad (2)$$

where a, b, and c represent configurable constants, $N_{softer}$ represents the number of sectors involved in the softer handoff condition, and $N_{soft}$ represents the number of sectors involved in the soft handoff condition.

To better understand Eq. (2), consider the simplest case where the current sector 12 is the serving sector. Here, g(X) simply takes on a value of "0," which results in no correction being applied. If the DRC symbol is detected with a null cover, indicating that the AT 30 is changing from one serving sector to another, g(X) takes on a value of "c," which may, for example, be a value of in the range of −5/3. This reduces the C/I estimate to reflect the likelihood that little reliable C/I estimation information may be gleaned from the DRC symbol value during a cover event.

If the current sector 12 is not the serving sector but originates from the same RBS 16 that provides the serving sector, then the value of g(X) is set as $a \cdot 10 \cdot \text{Log}(N_{softer}+1)$, where $N_{softer}$ represents the number of sectors from that RBS 16 that involved in the softer handoff condition. With the configurable value a set to an appropriate value, −1/1.25 for example, the value of g(X) takes on an increasingly negative value in proportion to the number of sectors 12 in softer handoff. If the current sector 12 is not the serving sector and is not a sector involved in softer handoff, then the value of g(X) is $a \cdot 10 \cdot \text{Log}(N_{softer}+1) \cdot b \cdot 10 \cdot \text{Log}(N_{soft}+1)$, where the configurable value b may be set to an appropriate value, such as −3/2 for example.

As an example, assume that the $i^{th}$ AT 30 has an active set of five sectors 12, where three of the sectors 12 are from a first RBS 16, and the remaining two sectors from a second RBS 16. Further, assume that one of the three sectors 12 from the first RBS 16 is the serving sector for the AT 30. For the serving sector, g(X) equals 0, for the two remaining sectors of the first RBS 16, $N_{softer}$ equals 3, while for two sectors from the second RBS 16, $N_{soft}$ equals 2.

While Eq. 1 provides for updated C/I ratios estimates upon receipt of each new DRC symbol from the $i^{th}$ AT 30, it may be desirable to filter the $\gamma_i(R,X)$ values so that RPC channel power control avoids or reduces rapid control changes. Filtering may be linear or non-linear, entailing simple smoothing or adopting more sophisticated filtering characteristics. In any case, because the DRC symbols values are available at roughly 600 Hz, $\gamma_i(R,X)$ may be filtered for more robust RPC channel power control and still yield good control response. An exemplary Infinite Impulse Response (IIR) filter is given as, $$H[D = 1.6, \ldots] = \frac{1 - (1 - 2^{-\alpha})}{1 - (1 - 2^{-\alpha}) \cdot D} \quad (3)$$

Where the output of Eq. (3) yields a filtered version of $\gamma_i(R,X)$, which is denoted as $\hat{\gamma}_i(n)$ for time n. The output of the filtered version of the estimated C/I ratio may be expressed as, $$\hat{\gamma}_i(n) = \hat{\gamma}_i(n-1) - 2^{-\alpha}\gamma_i(n-1) + 2^{-\alpha}\gamma_i(n) \quad (4)$$

which may be efficiently implemented as a series of 2's shifts and additions.

Figure 2:
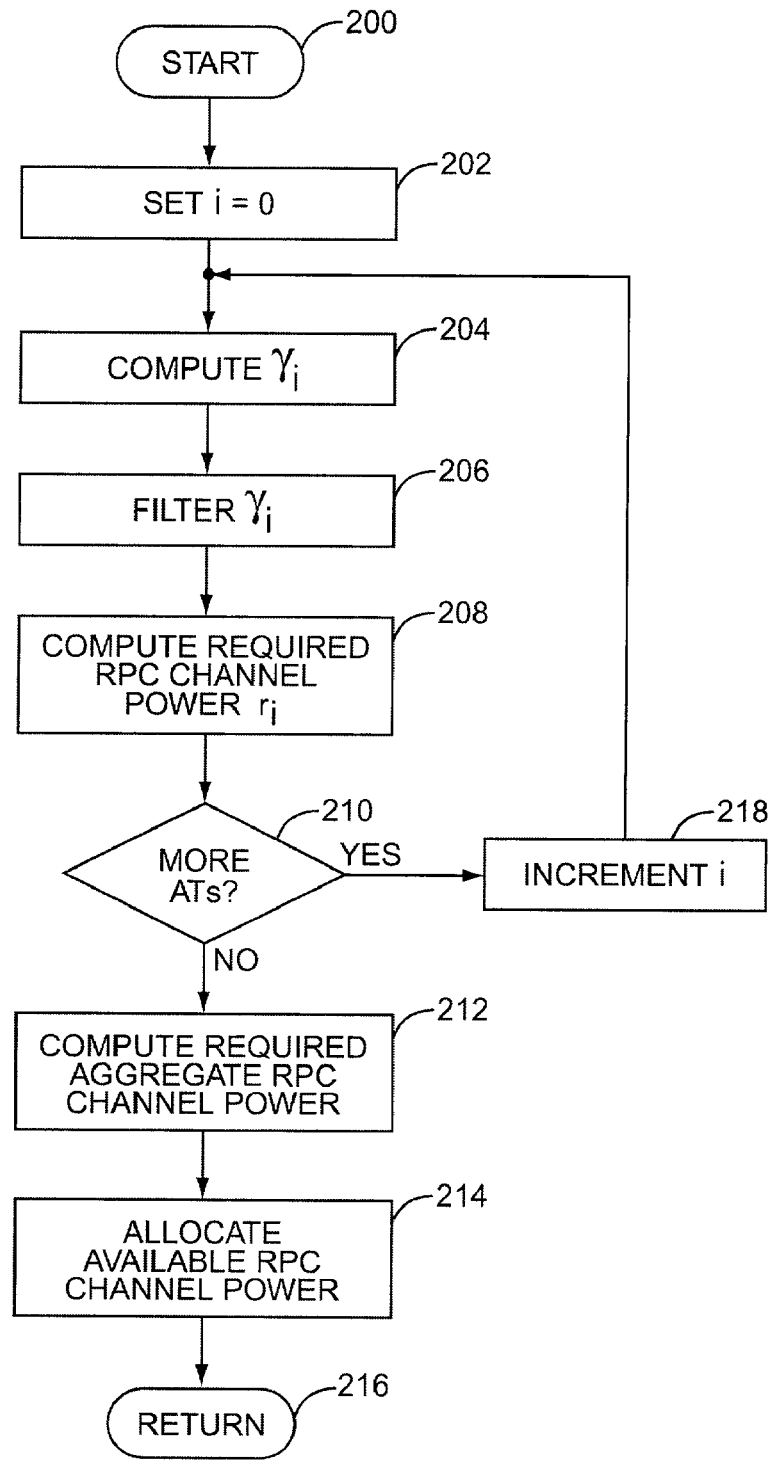
FIG. 2 is a diagram of exemplary flow logic for RPC channel power allocation within a sector of the network of FIG. 1.

With the above basis for computing estimated C/I ratios, FIG. 2 provides an overview of exemplary RPC channel power control for all active ATs 30 within a given sector 12. Processing begins (step 200) with the AT index i being set to "0," which corresponds to the first active AT 30 within the sector 12 (step 202). The estimated C/I ratio $\gamma_i(R,X)$ for the current AT 30 (i.e., the $i^{th}$ terminal) is computed according to Eq. (1) (step 204), and then optionally filtered (step 206).

The index i is then checked (step 210) to determine if there are any active ATs 30 remaining in the sector 12, in which case i is incremented (step 218) and an estimated C/I ratio is computed for the next AT 30 (steps 204–208). Once $\gamma_i(R,X)$ (or $\gamma_i(n)$) is computed for each of the active ATs 30 within the sector 12, the aggregate required RPC channel power for the entire sector 12 is computed considering the required RPC channel power for each $i^{th}$ AT 30 (step 212).

That is, a required RPC channel power may be computed for each AT 30 based on the corresponding estimated C/I ratio for that AT 30. One approach to determining the required RPC channel power begins by computing the received RPC channel bit energy to effective noise power spectral density at the $i^{th}$ AT 30. The received RPC channel bit energy to effective noise power spectral density may be expressed as, $$RPC\frac{E_b}{N_t} = \frac{RPC\, E_c}{I_{or}} \cdot \frac{R_c}{R_b} \cdot \sum_{l=1}^{L} \frac{a_l}{\frac{1}{\gamma_i}+1-a_l} \quad (5)$$

where $E_b$ is the bit energy, $N_t$ is the effective noise power spectral density, RPC $E_c$ is the RPC channel chip energy, $R_c/R_b$ is the processing gain expressed as chip rate to bit rate, $a_l$ is the path coefficient for the $l^{th}$ multipath between the sector's transmitter (e.g., one or more antennas on the sector's RBS 16) with a maximum of L multipaths, $\gamma_i$ is the estimated C/I ratio for the $i^{th}$ AT 30, which may or may not be a filtered value, and $I_{or}$ is the total transmit power for the sector.

Rearranging Eq. (5) to determine an expression for required RPC channel power yields, $$\frac{RPC\, E_c}{I_{or}} = \frac{RPC\frac{E_b}{N_t}}{\frac{R_c}{R_b} \cdot \sum_{l=1}^{L} \frac{a_l}{\frac{1}{\gamma_i}+1-a_l}} \quad (6)$$

where $$\frac{RPC\, E_c}{I_{or}}$$

represents the required RPC channel power normalized to the total available power. The symbol $r_i$ is also used herein to denote the required RPC channel power for the $i^{th}$ AT 30.

One may assume a desired SNR value for reception of the RPC channel at the AT 30 (e.g., one may set the value of $$RPC\frac{E_b}{N_t}$$

to a desired SNR value of, for example, +5 dB). With this assumption, the required RPC channel power $r_i$ to achieve the desired SNR at the AT 30 may be computed.

The total or aggregate required RPC channel power required for the sector 12 to provide each AT 30 with its required RPC channel power $r_i$ is given as, $$\sum_{i=0}^{K-1} r_i \quad (7)$$

where K is the total number of ATs 30 active within the sector 12.

Ideally, the sector 12 would allocate to each AT 30 the RPC channel power required by that AT 30, but it may be that the summation of required powers exceeds the total power available at the sector 12. Thus, the sector 12 must undertake allocation procedures in which the RPC channel power allocated to one or more of the ATs 30 is made in consideration of whether the aggregate RPC channel power exceeds available power (step 214).

The RPC channel is carried as part of the MAC channel, along with the Reverse Activity (RA) channel, which is used by the network 10 on the forward link to effect reverse link flow control. Thus, the total available power for the RPC channels is given as the total MAC channel power available, less the amount of MAC channel power used for the RA channels. The aggregate required RPC channel power may be evaluated to determine if it exceeds the total available power according to the following expression, $$\sum_{i=0}^{K-1} r_i \leq 1 - \frac{RA\, E_c}{I_{or}} \quad (8)$$

where $$\frac{RA\, E_c}{I_{or}}$$

is the portion of the total MAC channel power available at the sector 12 that must be allocated to the Reverse Activity (RA) channels, and where K represents the total number of active ATs 30 within the sector 12.

If the aggregate required RPC channel power is less than total available power, the sector 12 may allocate to each AT 30 the full amount of its required RPC channel power. However, if the aggregate required RPC channel power exceeds total available power, the sector 12 must adopt an allocation scheme that allocates available RPC channel power within the available power constraints.

Several methods are available for allocating RPC channel power where the aggregate required RPC channel power exceeds total available power. In general, the sector 12 may allocate a fixed percentage less than each AT's required RPC channel power, or may allocate the required RPC channel power to some ATs 30, while allocating reduced or no power to other ATs 30. Examples of these various schemes are explored below.

In a first approach, a "minimum-maximum" optimization technique is adopted that attempts to minimize the difference between the required and allocated RPC transmit power levels of all the active ATs 30 within the sector 12. Thus, the RPC channel power allocated to the ith AT 30 is given as, $$\hat{r}_i = \beta \cdot r_i \quad (9)$$

where $\hat{r}_i$ is the RPC channel power allocated, and $\beta$ is a scaling factor computed as, $$\beta = \frac{\left(1 - \frac{RA\ E_c}{I_{or}}\right)}{\sum_{j=0}^{K-1} \frac{RPC\ E_{c,j}}{I_{or}}} \quad (10)$$

A practical example might be where the aggregate required RPC channel power is 9/7 the total available RPC channel power at the sector 12. With this example, $\beta$ then takes on a value of 7/9, such that the RPC channel power allocated to the ith AT 30 is 7/9 the required RPC channel power for that AT 30.

One advantage to allocating RPC channel power in accordance with Eqs. (9) and (10) is that HDR networks 10 transmit at maximum power and the scaling value $\beta$ accommodates situations where the aggregate required RPC channel power is below the total available power or, as in the above example, where it exceeds the available power. Thus, in the above example, the scaling value $\beta$ took on a value of 7/9, thereby setting the allocated power $\hat{r}_i$ to 7/9 of the required power $r_i$. However, where the aggregate required power is less than the total available power, the scaling value $\beta$ takes on values greater than unity, thus setting the allocated power $\hat{r}_i$ greater than the required power $\hat{r}_i$.

In another approach, the RPC channel power allocation scheme considers the relative power requirements of one or more of the ATs 30. Initially, the ATs 30 are ordered in terms of ascending RPC channel power requirements as, $r_0, r_1, r_2, \ldots, r_{K-1}$. With this ordering scheme, RPC channel power is then allocated to the first (lowest required power) AT 30 as, $$\hat{r}_0 = \min\left\{r_0, \left(\frac{1 - RA\ Ec}{I_{or}}\right) \cdot \frac{1}{K}\right\}, \quad (11)$$

and allocated for the remaining ATs 30 as, $$\hat{r}_i = \min\left\{r_i, \left(\frac{1 - RA\ Ec}{I_{or}} - \sum_{j=0}^{i-1} r_j\right) \cdot \frac{1}{K}\right\}, \quad (12)$$

for all $i > 0$, and where $i \neq 0, i \neq j$

The above expressions allocate the minimum of the required RPC channel power or the average of the remaining available power available. Note that since some ATs 30 likely require significantly higher RPC channel power than others, some number of the lower power ATs 30 will likely be allocated their required RPC channel power (i.e., $\hat{r}_i = r_i$).

In another approach, the ATs 30 are ordered in ascending values of required RPC channel power as above. However, this approach allocates RPC channel power as, $$r_i = \begin{cases} r_i & \text{for all } i \leq j, \text{else} \\ \left(1 - \frac{RA\ Ec}{I_{or}} - \sum_{h=1}^{j-1} r_h\right) \cdot \frac{1}{K-j} \end{cases} \quad (13)$$

Eq. 13 acknowledges that it may be better to discard at least of a few of the ATs 30 requiring the highest RPC channel power in favor of providing the majority of ATs 30 within the sector with their required RPC channel power.

Once RPC channel power for the sector 12 is allocated, processing returns to other tasks associated with managing communications and resources at the RBS 16 supporting that sector 12. It should be understood that the foregoing RPC channel power allocation schemes are exemplary only, and that other schemes may be used in practicing the present invention. In general, the only real constraint is that RPC channel power allocation to the various ATs 30 active within any given sector 12 observes the constraints of power availability within that sector.

Comparisons between the aggregate required RPC channel power and the total available power may provide additional information useful beyond the above power allocation schemes. For example, sector congestion may be inferred by the relationship between the aggregate required RPC channel power and the available power. That is, where the aggregate required RPC channel power consistently exceeds the available power, one may infer the onset of sector congestion.

Figure 3:
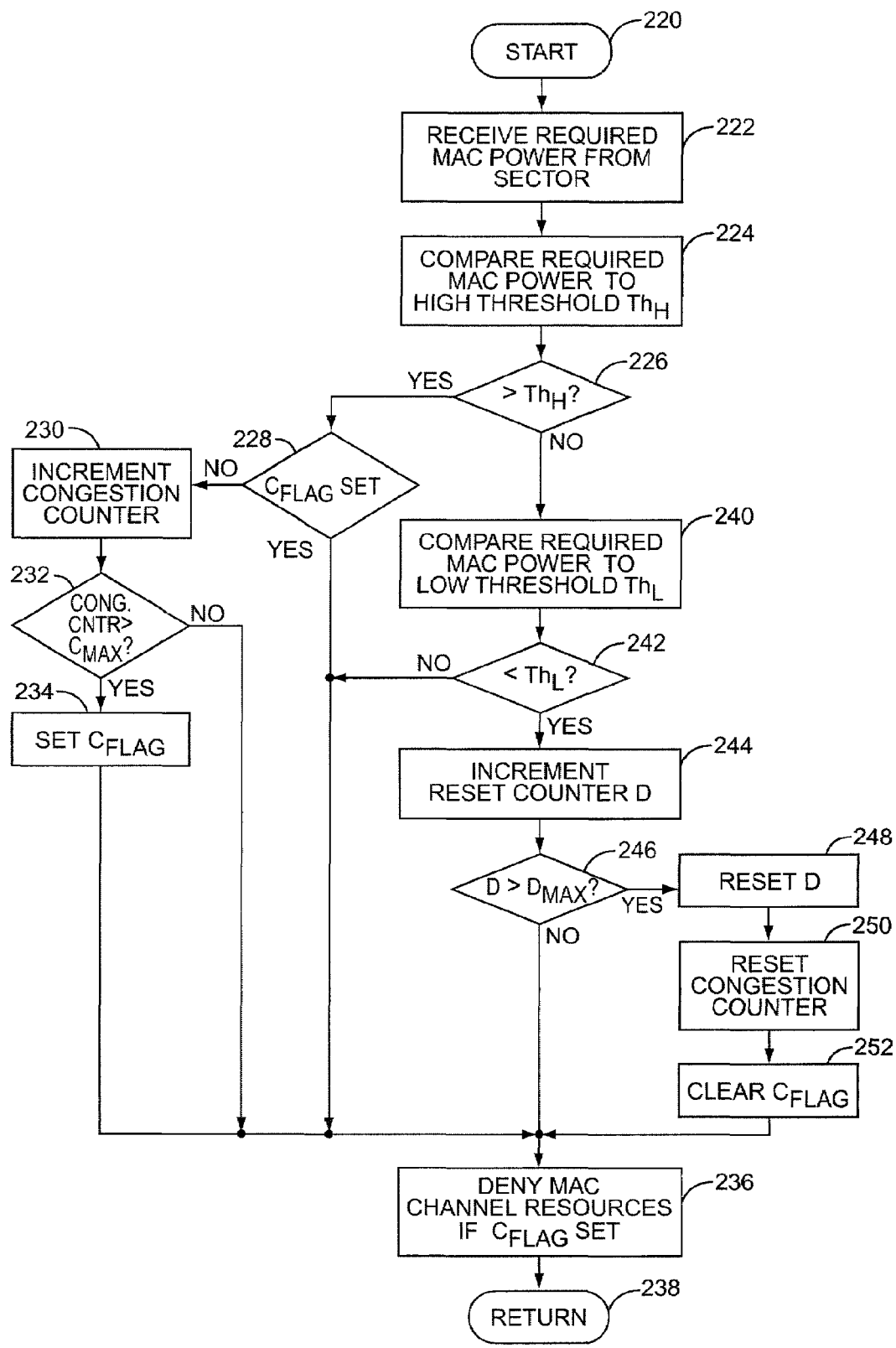
FIG. 3 is a diagram of exemplary congestion control based on RPC channel power calculations for one or more sectors of the network of FIG. 1.

FIG. 3 illustrates an exemplary approach that may be adopted by the BSC 18 in managing resources in one or more of the sectors 12 supported by the BSC 18. FIG. 3 depicts flow logic for one sector 12, but it should be understood that the BSC 18 may perform this logic or other resource management logic for any or all of the other sectors 12 supported by it.

Processing begins (step 220) with the BSC 18 receiving required MAC channel power from the RBS 16 supporting the given sector 12 (step 222). Here, the required MAC channel power includes the aggregate required RPC channel power before any power allocation adjustments (i.e., it includes $$\sum_{i=0}^{K-1} r_i$$

for K ATs 30 within the sector 12). In general, the rate at which the BSC 18 receives required power values depends upon the filtering applied to the underlying $r_i$ values.

The BSC 18 compares the required power value to a high threshold $TH_H$ (step 224), which may be a configurable value used to sense when the required MAC channel power exceeds available MAC channel power by a defined amount. If the high threshold is exceeded, the BSC 18 determines whether a congestion flag $C_{FLAG}$ is set (step 228). If the flag is already set, the BSC 18 advances to congestion control operations (step 236) and processing returns (step 238).

Congestion control operations may entail denying additional service (i.e., denying new AT connections within the sector 12), or may entail dropping or modifying service to selected ATs 30 within the sector 12.

If the $C_{FLAG}$ is not set, a congestion counter $C_{CNTR}$ is incremented (step 230). This counter is then compared to a defined count threshold, which may be a configurable value (step 232). If the count value exceeds the count threshold, the congestion flag $C_{FLAG}$ is set and processing continues with congestion control operations discussed above (step 236).

If the required MAC channel power does not exceed the high threshold $TH_H$ (step 224), processing continues with comparing the required MAC channel power to a defined low threshold $TH_L$, which may be a configurable value (step 240). By appropriately choosing the high and low thresholds $TH_H$ and $TH_L$, a hysteresis band may be defined for comparing required MAC channel power.

If the required MAC channel power is below the lower threshold $TH_L$ (step 242), processing continues by incrementing a reset counter D (step 244). The value of the reset counter D is then compared to a defined maximum reset count value $D_{MAX}$, which may be configurable (step 246). If the current value of D exceeds $D_{MAX}$ (step 246), the reset counter D is cleared (i.e., reset to its initial or default value) (step 248), the congestion counter $C_{CNTR}$ is cleared (step 250), and the congestion flag $C_{FLAG}$ is cleared (step 252), and processing returns to other BSC operations (step 238).

The BSC 18 may perform the above operations or other forms of congestion control for one or more of the RBSs 16 under its control on a per sector basis. With the above logic, the BSC 18 receives required MSC channel power for a given sector 12 from the associated RBS 16 and determines impending sector congestion based on the relationship of that required power to available power over time. Where the required MAC channel power chronically exceeds the available power, the BSC infers impending congestion and acts to relieve that congestion, or to at least prevent worsening congestion within the given sector 12.

Figure 4:
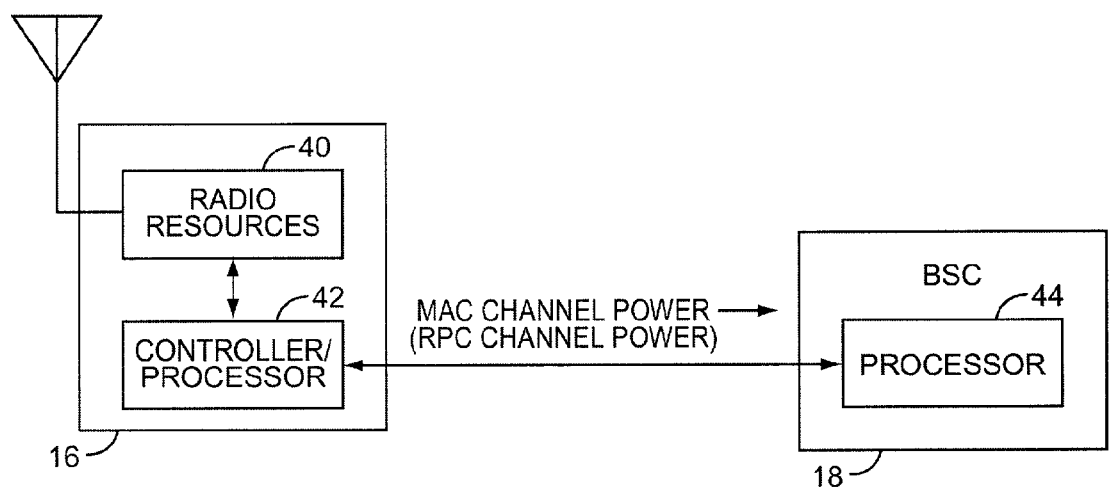
FIG. 4 is a diagram of exemplary radio base station and base station controller details adapted for practicing the present invention.

FIG. 4 is a diagram an exemplary simplified details for a RBS 16 and BSC 18 that include processing systems adapted for practicing the present invention. RBS 16 includes radio resources 40, and a system controller or processor 42. It should be understood that processor 42 may comprise a number of processing and control subsystems, such as those adapted for communicating with the radio resources 40, the BSC 18, and for managing and controlling the radio resources 40. With the present invention, the processor 42 is generally adapted to compute required and allocated RPC channel powers in accordance with the present invention, and may be particularly adapted to perform the processing outlined in exemplary form in FIG. 3.

Where aggregate required channel power information from one or more sectors 12 will be used for centralized sector congestion control, the processor 42 in the RBS 16 may be adapted to send aggregate RPC channel power estimates for one or more sectors 12 supported by the RBS 16. These aggregate estimates may be conveyed in terms of total required MAC channel power for the sector in question, where total required MAC channel power is based on the required RPC channel powers before any adjustments arising from available power constraints are made.

With this transfer of information from one or more RBSs 16 to the BSC 18, a processor 44 in the BSC 18 may receive aggregate RPC channel power estimates for one or more sectors 12 in the network 10. The processor 44 may then employ congestion control measures, such as those outlined in FIG. 4, for one or more of the sectors 12 for which it is receiving required RPC channel power information.

Those skilled in the art will appreciate that the present invention lends itself to many variations. For example, a variety of power allocation schemes may be adopted for allocating RPC channel power to one or more of the ATs 30 within a given sector 12. In general, the present invention provides a technique for inferring reception conditions at active ATs 30 within a sector 12, based on the requested data rates from those ATs 30. This inference then serves as a basis for determining required RPC channel powers for those ATs 30. Required RPC channel powers may then be adjusted in light of available sector power constraints, and, in some embodiments, used for sector congestion control. The foregoing details are thus exemplary only, and should not be construed as limiting the scope of the present invention. Indeed, the scope of the, present invention is limited only by the following claims and their reasonable equivalents.

What is claimed is:

1. A method of controlling Reverse Power Control (RPC) channel power in a HDR network the method comprising:
   receiving a data rate request from an access terminal; and
   setting a transmit power of a RPC channel for said access terminal based at least in part on said data rate request by:
      estimating reception conditions at said access terminal by estimating a carrier-to-interference (C/I) ratio for said access terminal based on said data rate request; and
      adjusting said estimated C/I ratio depending on a handoff condition of said access terminal; and
      setting said RPC channel power based in at least in part on said estimated C/I ratio.

2. The method of claim 1 further comprising:
   defining one or more bounds for said estimated C/I ratio using one or more bounding values; and
   setting said estimated C/I ratio to one of said bounding values when a calculated value for said estimated C/I ratio violates one of said bounds.

3. The method of claim 1 wherein adjusting said estimated C/I ratio depending on a handoff condition of said access terminal comprises reducing said estimated C/I ratio when said access terminal is in a soft handoff condition.

4. The method of claim 1 wherein, at a given sector in said network in which said access terminal has an active connection, adjusting said estimated C/I ratio depending on a handoff condition of said access terminal comprises:
   reducing said C/I ratio by a first amount when said sector is the serving sector for said access terminal; and
   reducing said C/I ratio by a greater amount when said sector is not the serving sector for said access terminal.

5. The method of claim 4 wherein receiving a data rate request from an access terminal comprises receiving a Data Rate Control (DRC) symbol via a DRC channel from said access terminal, said DRC symbol having a value corresponding to a defined data rate.

6. The method of claim 5 further comprising determining whether said sector is the serving sector based on a DRC cover value used by said access terminal for said DRC channel.

7. The method of claim 6 further reducing said estimated C/I ratio by a defined amount when said DRC cover value is a null cover value.

8. The method of claim 4 further comprising reducing said estimated C/I ratio in inverse proportion to a number of sectors within said network involved in soft handoff with said access terminal.

9. The method of claim 1 further comprising filtering said estimated C/I ratios for said access terminal to avoid abrupt RPC channel power control changes.

10. A method of controlling Reverse Power Control channel power in a sector of a HDR network, the method comprising:
    estimating required RPC channel powers for a plurality of access terminals active within said sector based on forward link data rates of said access terminals;
    determining an aggregate required RPC channel power based on said required RPC channel powers; and
    setting an allocated RPC channel power for each one of said plurality of access terminals based on said required RPC channel power for said access terminal and said aggregate required RPC channel power.

11. The method of claim 10 wherein estimating required RPC channel powers for a plurality of access terminals active within said sector based on forward link data rates of said access terminals comprises for each said access terminal:
    inferring reception conditions at said access terminal based on Data Rate Control (DRC) channel information associated with said access terminal and bearing on said forward link data rate of said access terminal; and
    estimating said required RPC channel power based on said inferred reception conditions at said access terminal.

12. The method of claim 11 wherein inferring reception conditions at said access terminal based on Data Rate Control (DRC) channel information associated with said access terminal comprises:
    receiving DRC symbols via said DRC channel associated with said access terminal, said DRC symbols indicating a requested forward link data rate for said access terminal; and
    estimating a carrier-to-interference (C/I) ratio for said access terminal.

13. The method of claim 12 wherein estimating said required RPC channel power based on said inferred reception conditions at said access terminal comprises determining said estimated required RPC channel power based on said estimated C/I ratio.

14. The method of claim 12 further comprising filtering said C/I ratios.

15. The method of claim 12 further comprising adjusting said C/I ratios when said access terminal is in handoff between sectors.

16. The method of claim 12 further comprising selecting a default C/I ratio for said C/I ratio during DRC symbol erasure events.

17. The method of claim 12 further comprising bounding said C/I ratio with at least one of said lower and upper C/I ratio limits.

18. The method of claim 12 further comprising adjusting said C/I ratio if a DRC cover value of said DRC symbols indicates that said sector is a non-serving sector for said access terminal.

19. The method of claim 12 wherein estimating said required RPC channel power based on said inferred reception conditions at said access terminal comprises:
    determining a desired signal-to-noise ratio (SNR) for said RPC channel at said access terminal; and
    calculating said required RPC channel power based on said desired SNR and said C/I ratio.

20. The method of claim 19 wherein calculating said required RPC channel power based on said desired SNR and said C/I ratio comprises deriving said required RPC channel power from a first expression for received RPC channel bit energy to effective noise power spectral density.

21. The method of claim 20 wherein said first expression comprises one or more factors arising from multipath reception of said RPC channel at said access terminal, and further comprising assuming default values for said one or more factors.

22. The method of claim 21 further comprising setting said default values of said one or more factors based on land morphology.

23. The method of claim 10 further comprising determining an available power for RPC channel power allocation at said sector.

24. The method of claim 23 wherein determining an available power for RPC channel power allocation at said sector comprises determining said available power as a total Medium Access Control (MAC) channel power available at said sector less an amount needed for Reverse Activity (RA) channel power at said sector.

25. The method of claim 23 wherein setting an allocated RPC channel power for each one of said plurality of access terminals based on said required RPC channel power for said access terminal and said aggregate required RPC channel power comprises:
    determining a scaling value as a ratio between said aggregate required RPC channel power and said available power; and
    setting said allocated RPC channel power for each said access terminal by scaling said required RPC channel power by said scaling value.

26. The method of claim 23 wherein setting an allocated RPC channel power for each one of said plurality of access terminals based on said required RPC channel power for said access terminal and said aggregate required RPC channel power comprises setting said allocated RPC channel power as less than said required RPC channel power for one or more of said access terminals if said aggregate required RPC channel power exceeds said available power at said sector.

27. The method of claim 23 wherein setting an allocated RPC channel power for each one of said plurality of access terminals based on said required RPC channel power for said access terminal and said aggregate required RPC channel power comprises setting said allocated RPC channel power as more than said required RPC channel power for one or more of said access terminals if said aggregate required RPC channel power is less than said available power at said sector.

28. The method of claim 23 wherein setting an allocated RPC channel power for each one of said plurality of access terminals based on said required RPC channel power for said access terminal and said aggregate required RPC channel power comprises:
    ordering said required RPC channel powers for said access terminals in ascending order; and
    setting said allocated RPC channel powers for said access terminals according to said ascending order as a minimum of said required RPC channel power for each said access terminal and an average RPC channel power computed from a remaining available power.

29. The method of claim 23 wherein setting an allocated RPC channel power for each one of said plurality of access terminals based on said required RPC channel power for said access terminal and said aggregate required RPC channel power comprises:
    ordering said required RPC channel powers for said access terminals in ascending order; and setting said allocated RPC channel power to said access terminals as said required RPC channel powers until said available power is exhausted.

30. A method of admission control in a HDR network, the method comprising:
   receiving aggregate estimates of required RPC channel power for one or more sectors in said network by receiving total required Medium Access Control (MAC) channel powers from said one or more sectors, wherein the total required MAC channel power from a given sector comprises the aggregate required RPC channel power for the sector;
   monitoring said aggregate estimates in relation to available powers in said one or more sectors to maintain congestion indicators for said one or more sectors; and
   controlling call admission in said one or more sectors based on said congestion indicators.

31. The method of claim 30 wherein monitoring said aggregate estimates in relation to available powers in said one or more sectors to maintain congestion indicators for said one or more sectors comprises for each sector:
   receiving a number of aggregate estimates from the sector;
   determining whether or not said aggregate estimates from the sector indicate congestion in said sector by comparing said aggregate estimates from said sector to at least one threshold bearing on a relationship between said aggregate estimates and an available power at said sector; and
   setting said congestion indicator corresponding to said sector if congestion in said sector is indicated by said comparison.

32. The method of claim 31 wherein determining whether or not said aggregate estimates from the sector indicate congestion in said sector by comparing said aggregate estimates from said sector to at least one threshold bearing on a relationship between said aggregate estimates and an available power at said sector comprises:
   updating a congestion counter if a current aggregate estimate from said sector exceeds an upper threshold and said congestion indicator is not set;
   updating a reset counter if said current aggregate estimate from said sector is below a lower threshold;
   setting said congestion indicator if said congesting counter reaches a defined congestion count value; and
   clearing said congestion counter and said congestion indicator if said reset counter reaches a defined reset count value.

33. The method of claim 31 wherein determining whether or not said aggregate estimates from the sector indicate congestion in said sector by comparing said aggregate estimates from said sector to at least one threshold bearing on a relationship between said aggregate estimates and an available power at said sector comprises determining whether or not said aggregate estimates generally exceed said available power at said sector.

34. The method of claim 33 further comprising setting and clearing said congestion indicator based on applying a hysteretic comparison function to said aggregate estimates.

35. The method of claim 30 wherein controlling call admission in said one or more sectors based on said congestion indicators comprises, for each said sector, denying new connections with access terminals seeking connection to said network via said sector when said congestion indicator is set.

36. The method of claim 30 wherein controlling call admission in said one or more sectors based on said congestion indicators comprises, for each said sector, dropping service to one or more access terminals having a connection to said network via said sector when said congestion indicator is set.

37. A radio base station for use in an HDR network, said radio base station comprising a processor adapted to:
   estimate required RPC channel powers for a plurality of access terminals active within a sector of said network supported by said radio base station based on forward link data rates of said access terminals;
   determine an aggregate required RPC channel power based on said required RPC channel powers; and
   set an allocated RPC channel power for each said access terminal based on said required RPC channel power for said access terminal and said aggregate required RPC channel power.

38. The radio base station of claim 37 wherein said processor estimates said required RPC channel power for each said access terminal by:
   inferring reception conditions at said access terminal based on Data Rate Control (DRC) channel information associated with said access terminal and bearing on said forward link data rate of said access terminal; and
   estimating said required RPC channel power based on said inferred reception conditions at said access terminal.

39. The radio base station of claim 38 wherein said processor infers said reception conditions at said access terminal based on Data Rate Control (DRC) channel information associated with said access terminal by:
   receiving DRC symbols via said DRC channel associated with said access terminal, said DRC symbols indicating a requested forward link data rate for said access terminal; and
   estimating a carrier-to-interference (C/I) ratio for said access terminal.

40. The radio base station of claim 39 wherein said processor estimates said required RPC channel power based on said inferred reception conditions at said access terminal by determining said estimated required RPC channel power based on said estimated C/I ratio.

41. The radio base station of claim 39 wherein said processor is further adapted to filter said C/I ratios.

42. The radio base station of claim 39 wherein said processor is further adapted to adjust said C/I ratios when said access terminal is in handoff between sectors in said network.

43. The radio base station of claim 37 wherein said processor is further adapted to transfer information bearing on said aggregate required RPC channel power to a base station controller associated with said radio base station.

44. A radio base station controller for use in an HDR network, said radio base station controller comprising a processor adapted to:
   receive aggregate estimates of required RPC channel power for one or more sectors in said network by receiving total required Medium Access Control (MAC) channel powers from one or radio base stations associated with said one or more sectors, wherein the total required MAC channel power for a given sector comprises the aggregate required RPC channel power for the given sector;
   determine whether or not said aggregate estimates indicate congestion in said one or more sectors; and
   control call admission in said one or more sectors based at least in part on indicated congestion as determined from said aggregate estimates.

45. The radio base station controller of claim 44 wherein said processor determines whether or not said aggregate estimates indicate congestion in one of said one or more sectors by determining whether said aggregate estimates for said sector generally exceed an available power at said sector.

46. The radio base station controller of claim 44 wherein said processor determines whether or not said aggregate estimates indicate congestion in one of said one or more sectors by comparing said aggregate estimates from said sector to at least one threshold bearing on a relationship between said aggregate estimates and an available power at said sector.

47. The radio base station controller of claim 44 wherein said processor determines whether or not said aggregate estimates indicate congestion in said one or more sectors by monitoring said aggregate estimates for said one or more sectors in relation to available powers in said one or more sectors.

48. The radio base station controller of claim 47 wherein said processor maintains one or more congestion indicators for said one or more sectors based on said monitoring of said aggregate estimates.

49. The radio base station controller of claim 48 maintains said one or more congestion indicators by:
receiving a number of aggregate estimates for each sector;
determining whether or not said aggregate estimates from the sector indicate congestion in said sector by comparing said aggregate estimates from said sector to at least one threshold bearing on a relationship between said aggregate estimates and an available power at said sector; and
setting said congestion indicator corresponding to said sector if congestion in said sector is indicated by said comparison.

50. The radio base station controller of claim 49 wherein said processor sets and clears said congestion indicator by applying a hysteretic comparison function to said aggregate estimates.

51. The radio base station controller of claim 44 wherein said processor determines whether or not said aggregate estimates indicate congestion in each one of said one or more sectors by:
updating a congestion counter if a current aggregate estimate from the sector exceeds an upper threshold and said congestion indicator is not set;
updating a reset counter if said current aggregate estimate from said sector is below a lower threshold;
setting said congestion indicator if said congesting counter reaches a defined congestion count value; and
clearing said congestion counter and said congestion indicator if said reset counter reaches a defined reset count value.

52. The method of controlling Reverse Power Control (RPC) channel power in a HDR network the method comprising:
receiving data rate requests from a plurality of access terminals at a sector within said network; and
setting RPC channel powers for said plurality of access terminals based at least in part on said data rate requests by:
estimating reception conditions at said access terminals based on said data rate requests;
estimating required RPC channel powers for said access terminals based on said estimated reception conditions;
determining an aggregate required RPC channel power based on said required RPC channel powers estimated for said access terminals; and
setting allocated RPC channel powers for said access terminals based on said required RPC channel powers and on said aggregate required RPC channel power.

53. The method of claim 52 wherein setting allocated RPC channel powers for said access terminals based on said required RPC channel powers and on said aggregate required RPC channel power comprises setting said allocated RPC channel power for one or more ones of said access terminals to be less than said required RPC channel powers estimated for said one or more ones of said access terminals if said aggregate required RPC channel power exceeds an available power at said sector.

54. The method of claim 53 wherein setting said allocated RPC channel power for one or more ones of said access terminals to be less than said required RPC channel powers estimated for said one or more ones of said access terminals if said aggregate required RPC channel power exceeds an available power at said sector comprises setting said allocated RPC channel powers for said one or more ones of said access terminals such that an aggregate allocated RPC channel power of said access terminals does not exceed said available power.

55. The method of claim 54 further comprising setting said allocated RPC channel powers to be at least equal to said required RPC channel powers for one or more other ones of said access terminals.

56. The method of claim 54 wherein setting allocated RPC channel powers for said access terminals based on said required RPC channel powers and on said aggregate required RPC channel power comprises setting said allocated RPC channel powers to be at least equal to said required RPC channel power for selected ones of said access terminals.

57. The method of claim 52 wherein setting allocated RPC channel powers for said access terminals based on said required RPC channel powers and on said aggregate required RPC channel power comprises:
determining a relationship between said aggregate required RPC channel power and an available power; and
setting said allocated RPC channel power for each one of said access terminals based on said required RPC channel power for said access terminal and said relationship between said aggregate required RPC channel power and said available power.

58. A method of controlling Reverse Power Control (RPC) channel power in a HDR network the method comprising:
receiving a data rate request from an access terminal; and
setting a transmit power of a RPC channel for said access terminal based at least in part on said data rate request by:
estimating reception conditions at said access terminal by estimating a carrier-to-interference (C/I) ratio for said access terminal based on said data rate request; and
defining one or more bounds for said estimated C/I ratio using one or more bounding values; and
setting said estimated C/I ratio to one of said bounding values when a calculated value for said estimated C/I ratio violates one of said bounds; and
setting said RPC channel power based in at least in part on said estimated C/I ratio.

* * * * *

UNITED STATES PATENT AND TRADEMARK OFFICE
CERTIFICATE OF CORRECTION

| | | |
|---|---|---|
| PATENT NO. | : 7,085,581 B2 | Page 1 of 1 |
| APPLICATION NO. | : 09/940293 | |
| DATED | : August 1, 2006 | |
| INVENTOR(S) | : Vanghi | |

It is certified that error appears in the above-identified patent and that said Letters Patent is hereby corrected as shown below:

On the Title Page, in Field (60), under "Related U.S. Application Data", in Column 1, Lines 1-2, delete "Jun. 4, 2001" and insert -- June 1, 2001 --, therefor.

In Column 1, Lines 7-8, delete "Jun. 4, 2001" and insert -- June 1, 2001 --, therefor.

In Column 7, Line 54, Equation 2, delete
" $a \cdot 10 \cdot \text{Log}(N_{softer} + 1) \cdot b \cdot 10 \cdot \text{Log}(N_{sof} + 1)$ " and insert
-- $a \cdot 10 \cdot Log(N_{softer} + 1) \cdot b \cdot 10 \cdot Log(N_{sof} + 1)$ --, therefor.

In Column 18, Line 58, in Claim 44, after "one or" insert -- more --.

In Column 20, Line 28, in Claim 56, delete "54" and insert -- 52 --, therefor.

Signed and Sealed this

First Day of April, 2008

JON W. DUDAS
*Director of the United States Patent and Trademark Office*